(12) United States Patent
Cariou et al.

(10) Patent No.: US 9,071,965 B2
(45) Date of Patent: Jun. 30, 2015

(54) METHOD FOR ALLOCATING DATA-TRANSMISSION RESOURCES, AND CORRESPONDING SWITCHING METHOD, ACCESS POINT, TERMINAL, COMPUTER PROGRAM AND SIGNAL

(75) Inventors: Laurent Cariou, Rennes (FR); Philippe Christin, Rennes (FR); David Bernard, Marcille Raoul (FR)

(73) Assignee: ORANGE, Paris (FR)

( * ) Notice: Subject to any disclaimer, the term of this patent is extended or adjusted under 35 U.S.C. 154(b) by 437 days.

(21) Appl. No.: 13/509,761

(22) PCT Filed: Nov. 10, 2010

(86) PCT No.: PCT/FR2010/052411
§ 371 (c)(1),
(2), (4) Date: Aug. 2, 2012

(87) PCT Pub. No.: WO2011/058275
PCT Pub. Date: May 19, 2011

(65) Prior Publication Data
US 2012/0294246 A1    Nov. 22, 2012

(30) Foreign Application Priority Data

Nov. 12, 2009  (FR) ...................... 09 57979

(51) Int. Cl.
*H04W 36/06*    (2009.01)
*H04W 12/06*    (2009.01)
(Continued)

(52) U.S. Cl.
CPC .......... *H04W 12/06* (2013.01); *H04W 36/0005* (2013.01); *H04W 36/06* (2013.01); *H04W 72/00* (2013.01); *H04W 72/04* (2013.01); *H04W 88/08* (2013.01)

(58) Field of Classification Search
CPC ..................................................... H04W 36/06
USPC ......... 370/237, 329, 338, 392, 393, 352, 355, 370/395.54, 477
See application file for complete search history.

(56) References Cited

U.S. PATENT DOCUMENTS

| 6,628,943 | B1 * | 9/2003 | Agrawal et al. ............. 455/432.1 |
| 7,088,705 | B2 * | 8/2006 | Curry et al. .................... 370/352 |

(Continued)

OTHER PUBLICATIONS

International Search Report and Written Opinion dated Feb. 2, 2011 for corresponding International Application No. PCT/FR2010/052411, filed Nov. 10, 2010.

(Continued)

*Primary Examiner* — Andrew Lai
*Assistant Examiner* — Andrew C Lee
(74) *Attorney, Agent, or Firm* — David D. Brush; Westman, Champlin & Koehler, P.A.

(57) ABSTRACT

A method and apparatus are provided for allocating resources in a communication network including at least one access point exchanging data with at least one terminal connected thereto, and managing at least two communication channels. The method in the access point implements a phase of associating and authenticating a terminal with the access point, including a step of associating a unique identifier with the terminal, and a phase of managing the assembly of channels. The phase of managing includes implementing a reference table associating one of the channels to a terminal identified by the unique identifier thereof, including the following steps: detecting a switching of a terminal connected with the access point, from an initial channel to a destination channel; and updating the reference table to associate the unique identifier of the terminal to the destination channel.

14 Claims, 4 Drawing Sheets

(51) Int. Cl.
  *H04W 36/00* (2009.01)
  *H04W 72/00* (2009.01)
  *H04W 72/04* (2009.01)
  *H04W 88/08* (2009.01)

(56) References Cited

U.S. PATENT DOCUMENTS

| | | | | |
|---|---|---|---|---|
| 7,796,996 | B2* | 9/2010 | Takano | 455/450 |
| 7,844,057 | B2* | 11/2010 | Meier et al. | 380/270 |
| 8,121,296 | B2* | 2/2012 | Hawkes et al. | 380/283 |
| 8,184,641 | B2* | 5/2012 | Alt et al. | 370/395.54 |
| 8,213,460 | B1* | 7/2012 | Buckland | 370/474 |
| 8,305,980 | B1* | 11/2012 | Nix | 370/329 |
| 8,358,649 | B2* | 1/2013 | Wu et al. | 370/355 |
| 8,406,794 | B2* | 3/2013 | Lee et al. | 455/502 |
| 8,718,279 | B2* | 5/2014 | Rose et al. | 380/44 |
| 2002/0191572 | A1* | 12/2002 | Weinstein et al. | 370/338 |
| 2004/0042402 | A1* | 3/2004 | Galand et al. | 370/237 |
| 2004/0185887 | A1 | 9/2004 | Wolman et al. | |
| 2006/0291432 | A1 | 12/2006 | Xhafa et al. | |
| 2008/0186927 | A1* | 8/2008 | Alam et al. | 370/338 |
| 2008/0205345 | A1* | 8/2008 | Sachs et al. | 370/332 |
| 2009/0010213 | A1* | 1/2009 | Yamada et al. | 370/329 |
| 2009/0040995 | A1* | 2/2009 | Buddhikot et al. | 370/338 |
| 2009/0070583 | A1* | 3/2009 | von Mueller et al. | 713/168 |
| 2009/0113036 | A1* | 4/2009 | Zampiello | 709/224 |
| 2009/0258647 | A1* | 10/2009 | Yamada et al. | 455/435.1 |
| 2009/0262718 | A1* | 10/2009 | Meier et al. | 370/338 |
| 2009/0280805 | A1* | 11/2009 | Kim et al. | 455/434 |
| 2009/0300066 | A1* | 12/2009 | Guo et al. | 707/104.1 |
| 2010/0046443 | A1* | 2/2010 | Jia et al. | 370/329 |
| 2010/0220668 | A1* | 9/2010 | Yamada et al. | 370/329 |

OTHER PUBLICATIONS

Preliminary Report on Patentability and English translation of the Written Opinion dated Jun. 5, 2012 for corresponding International Application No. PCT/FR2010/052411, filed Nov. 10, 2010.
French Search Report and Written Opinion dated Jul. 21, 2010 for corresponding French Application No. 0957979, filed Nov. 12, 2009.
Standard IEEE 802.11r (IEEE P802.11r/D9.0, Jan. 2008), 11.A "Fast Transition".
Standard IEEE 802.11h (P802.11h/D3.11, May 2003 ((Draft Supplement to IEEE Std 082/11, 2003 Edition); 5.4.4.2 "Dynamic Frequency Selection"; 7.3.2.22 "IBSS DFS Element"; 11.6 "DFS Procedure".
Norme—IEEE Standard for Information technology, Telecommunications and information exchange between systems Local and metropolitan area networks, Specific requirements, Part 11: Wireless LAN Medium Access Control (MAC) and Physical Layer (PHY) Specifications, IEEE Std 80211™-2007.

* cited by examiner

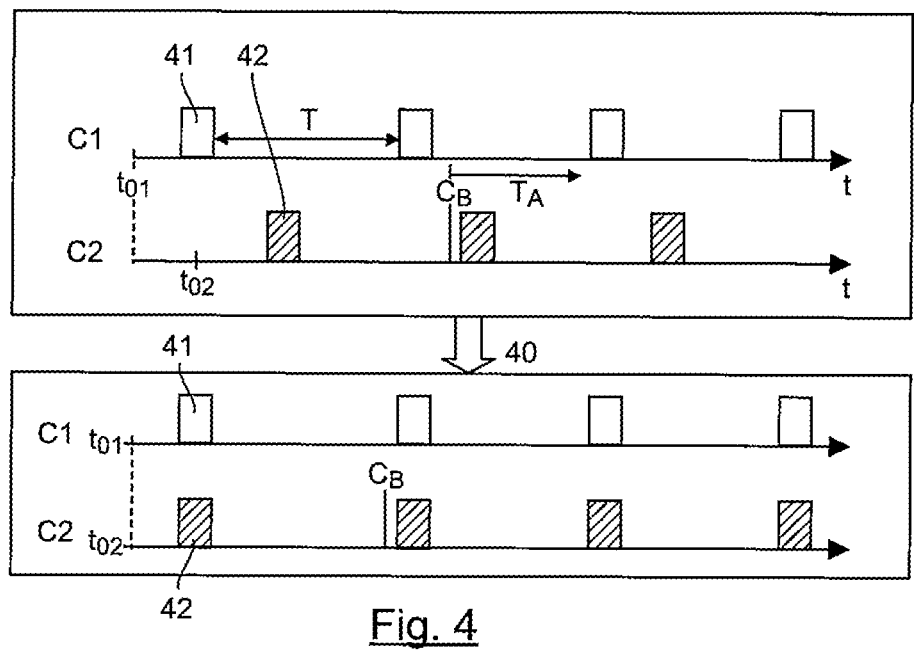
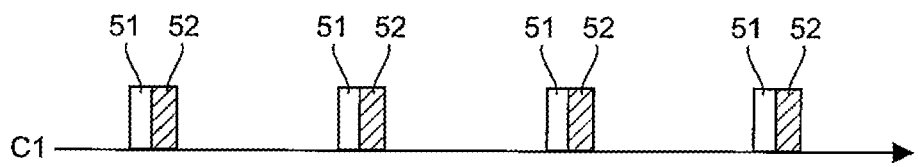
Fig. 5a
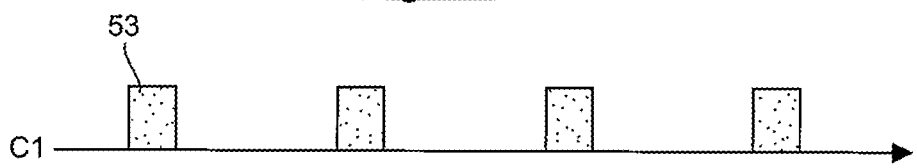
Fig. 5b
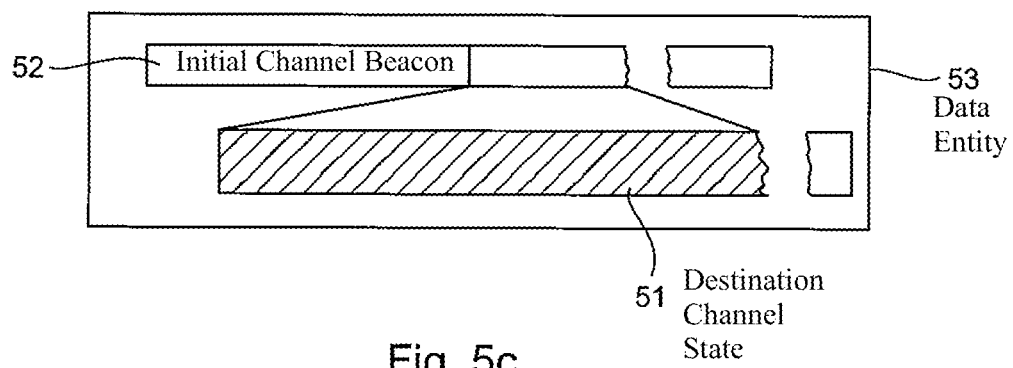
Fig. 5c

METHOD FOR ALLOCATING DATA-TRANSMISSION RESOURCES, AND CORRESPONDING SWITCHING METHOD, ACCESS POINT, TERMINAL, COMPUTER PROGRAM AND SIGNAL

CROSS-REFERENCE TO RELATED APPLICATIONS

This Application is a Section 371 National Stage Application of International Application No. PCT/FR2010/052411, filed Nov. 10, 2010, which is incorporated by reference in its entirety and published as WO 2011/058275 on May 19, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of radiofrequency communications, and more particularly, the management of frequency resources between terminals, or stations, and a point of access to a communications network. The disclosure can be applied especially, but not exclusively, to equipment of a local wireless network, and for example to systems emitting in a frequency band situated around 2.4 GHz or 5 GHz, especially in which equipments function according to the IEEE 802.11n standard or its revised versions, also called Wi-Fi.

The term "equipment" is understood here to mean a basic service set (BSS) formed by an access point (AP) or a wireless personal area network coordinator (PicoNet Coordinator abbreviated as PNC) and the stations associated with this access point, i.e. the stations situated in the coverage zone of this access point.

More specifically, the disclosure pertains to the management of the resources of an access point capable of simultaneously transmitting on at least two channels and, more particularly, a mechanism for allocating, or assigning, data-transmission resources and a mechanism for switching a terminal between two channels.

BACKGROUND OF THE DISCLOSURE

A description is provided here below of the frequency resources of equipment of a network working especially according to a Wi-Fi technology as defined in the IEEE 802.11r standard proposing a fast BSS transition of a station between a first set of basic services managed by a first access point and a second set of basic services managed by a second distinct access point.

According to this standard, an access point manages a unique given channel. A mechanism is proposed in order to enable a switching of a data transmission from one access point to another access point and, therefore, in general, with a change in channel in the event of mobility of the terminal. In other words, this IEEE 802.11r standard enables a switching of a data transmission, the concerned terminal then having to get associated with a new access point managing a new channel.

This switching mechanism comprises several lengthy and complex processing phases. Indeed, the switching terminal must "discover" the new access point, get authenticated and get associated with this access point, especially by exchange and recognition of encryption keys.

Despite the gains provided by this technique where the duration of preparation of the transition (up to a few seconds) is anticipated, there remains nevertheless a duration of transition of the order of 50 ms. Such a switching duration introduces a momentary interruption of service, which is not acceptable for numerous applications, and for example for the transmission of a video.

In the event of disturbance of the radio channel by a radar, it has been envisaged that an access point can change channels in the same frequency band, to avoid disturbing the radar transmissions considered to be priority transmissions. Indeed, in this case, a channel switching can be implemented by a same access point. To this end, the 802.11h standard specifies especially adaptations for the management, in Europe, of the spectrum and of the transmission power of computer networks using a wireless link in the 5 GHz frequency band. The standard stipulates in particular mechanisms of dynamic selection of frequency and control of the transmission power also known as "Spectrum and Transmit Power Management Extensions in the 5 GHz band".

In particular, in this standard, dynamic frequency selection (DFS) is based on a frame for managing the switching which makes a "channel switch announcement". Thus, an access point deciding to launch a channel switching procedure, sends this specific management frame with an access to the priority channel (channel free for a specific duration denoted as "PIFS" for "point coordination function inter-frame spacing"). This frame contains especially the number of the new channel and the countdown time before the change. This change is expressed in number of beacons.

A beacon is a management frame containing all the pieces of information of the communications network, especially the pieces of information on the channel on which they are transmitted periodically by the access point. They play a stamping role, and synchronize all the terminals of a same channel, attached to the access point. The beacon intervals between the sending of two successive beacons are parametrized by the access point. Besides, these beacons contain pieces of information making it possible to know the characteristics of the basic service sets proposed by the access point, for example the identity of the access point (BSSID or "Basic Service Set Identification"), the frequency band, the channel number in this frequency band, and the options supported by the PHY/MAC layers.

This standard offers the advantage of interrupting the transmissions for a very short time, since the stations recover the same access point in the new channel, with no fresh authentication or fresh association. However, this approach enables only a change of channel in a same frequency band.

Moreover, this approach is not a multi-channel approach, since an access point is always, at a given point in time, associated with a single channel. Indeed, the drawback of this technique according to the 802.11h standard is that it gives rise to the channel switching of all the terminals attached to the access point. In other words, if a channel changing action is launched, the totality of the flows managed by the access point is rerouted to another channel. It is not possible to effect a distribution of the load between different channels for a considered access point.

The American patent application US 2004/185887 concerns a wireless network node in a multi-channel context, the network comprising at least two transceivers statically tuned to non-interfering channels. The drawback of this technique lies in the fact that, at each change of channel, an association and authentication procedure has to be performed, consequently stretching the transmission interruption time during the channel switching or band switching.

There is therefore a need for a solution enabling the acceleration of these changes of channels for multi-channel access points with a view to current projects. Indeed, a situation of asynchronous channels managed by different mechanisms is currently envisaged in the future IEEE 802.11ac standard currently being prepared.

This future standard targets the use of increasingly broad radiofrequencies channels having for example a width equal to 80 MHz (corresponding to the aggregation of four 20 MHz channels) or more.

Thus, FIG. 1a illustrates this mechanism for a desired channel with a width of 20 MHz, 40 MHz, 60 MHz or 80 MHz, capable of being constituted, in one alternative, by four adjacent 20 MHz channels. To this end, this mechanism defines a primary channel on which there is applied a CSMA-CA ("Carrier Sense Multiple Access-Collision Avoidance") access mode as described in the 802.11-2007 standard, paragraph 9.1 "MAC architecture" and 9.1.1 "DCF" as well as the sending of a beacon by an access point further managing a channel known as a secondary channel, a tertiary channel and a channel called a quaternary channel. In this alternative, the CSMA-CA access mode is implemented only on the primary channel, the other three channels being synchronized on this primary channel, i.e. working according to the same access mode.

However, this future standard stipulates that it can prove to be difficult to find a free 80 MHz band in the available band and proposes an alternative, illustrated in FIG. 1b, to transmit at 80 MHz in creating two channels desynchronized and separated in frequencies which, when added together, form an 80 MHz channel. Thus, in this alternative shown in FIG. 1b, the two desynchronized channels are 40 MHz channels, each formed by a primary channel (1 and 2) and a secondary channel (1 and 2). On each of the primary channels 1 and 2, two distinct access modes and two distinct beacons are then used, the entire set being managed by a single access point then possessing a multi-channel function.

Besides, the future IEEE 802.11ad standard, also under preparation, pertains to a Wi-Fi system working at 60 GHz and introduces the possibility of switching between the 60 GHz frequency band and the 5 GHz frequency band. This future standardization also requires a fast and fluid switching without deterioration of a possible transmission in progress, whether or not the 60 GHz and 5 GHz channels are synchronized.

In this particular context pertaining to future standardizations, the inventors have therefore identified a need for a novel technique for optimizing the allocation of resources and the operations of switching from one channel to another, fluidly and rapidly, whether the channels are synchronous (i.e. managed by the same access mode) or asynchronous (i.e. managed by access modes distinct from one channel to another), and whether or not the channels are contiguous.

SUMMARY

An illustrative aspect of the present disclosure relates to a method for allocating data-transmission resources in a communications network comprising at least one access point exchanging data with at least one terminal being linked to it and managing a set of at least two communications channels.

According to an embodiment of the invention, the access point implements a phase for associating and authenticating a terminal with said access point, comprising a step for associating, with said terminal, a unique identifier in said access point.

The access point also implements a phase for managing said set of channels, using a reference table associating, with a terminal, identified by its unique identifier, one of said channels. Said phase for managing further comprises the following steps:
  detecting a switching of a terminal linked to said access point, from a first channel, called an initial channel, to a second channel called a destination channel;
  updating said reference table to associate the unique identifier of said terminal with said destination channel.

Thus an embodiment of the invention relies on a novel and inventive approach for allocating channels, in a multi-channel access point, according to which at least certain parameters, and especially the identifier of a terminal, are pooled between all the channels associated with the access point. In other words, the identifier is independent of the channel used at a given point in time. The procedure for associating and authenticating a terminal is not done, as is the case in the prior art, with a particular channel but with the access point (and therefore for all the channels that it manages). This process accelerates a change of channel since it is no longer necessary to launch a new procedure for associating and authenticating for each change of channel. Thus, a change of channel can be done in a sufficiently short time, without interruption of service.

To manage the different communications channels in its charge, the access point has available a reference table associating the unique identifier of a terminal with the current channel (or initial channel) associated with this terminal. This table, which must be interpreted here in the broad sense of a tool associating pieces of information (in the form of lists, data bases etc.) makes it possible to manage a channel change for a particular terminal, without the other terminals associated with the access point being affected.

When the access point detects an effective switching (which can be done following a request sent by the access point and following a decision by the terminal, according to different embodiments of the invention, as explained here below) of a terminal to another channel, it updates this reference table accordingly.

According to one particular embodiment, said phase for associating and authenticating also comprises a step for exchanging at least one encryption key between said access point and said terminal, said encryption key or keys being common for said set of channels.

Thus, according to this embodiment of the invention, the exchange of encryption keys between the access point and the terminal is valid whatever the channel associated with the terminal. Thus, the originally exchanged encryption keys remain valid after a switch. Since the terminal is identified and authenticated by the access point and by the set of channels managed by the access point, it is not necessary to carry out a new exchange of keys in the event of switching, and this also improves the switching time.

According to one particular characteristic of an embodiment of the invention, the method further comprises, in said access point, a step for sending, on said initial channel, a command for changing a channel allocated to a terminal linked to said access point, said command for changing an allocated channel comprising at least said identifier of the terminal and an identifier of said destination channel.

Thus, according to this embodiment of the invention, it is the access point that decides on the appropriateness of a change of channel for one of the terminals in its charge, on the basis of an analysis of the respective loads of the channels and/or the needs of the terminals. It then sends out a specific command for changing the allocated channel addressed to the terminal, the allocations being not modified for the other terminals.

In other words, an access point can request a terminal to change channels, without the other terminals of the system transmitting on this same channel being necessarily obliged to switch as well.

In certain implementations, it is of course possible that a command of this kind will simultaneously affect several terminals or even, if need be, all the terminals of a given channel.

For example, an access point detecting an overload on a particular channel can decide to make only a part of the terminals transmitting on this channel change channels so as to unload the channel in question.

As already specified, this change of channel can be done very speedily, since it does not necessitate a renegotiation of parameters at the destination channel, these parameters being pooled at the access point, i.e. being common to all the channels being managed by this access point.

According to one particular aspect of an embodiment of the invention, the command for changing channel comprises a field for designating the terminals concerned, comprising a plurality of bits each associated with one of the terminals and taking a first value when the terminal must carry out the switching towards the destination channel and a second value when it must keep the initial channel.

Thus, to the command for switching channels, there is added a "bitmap" field designating the terminals concerned, thus enabling fast and simple detection in the terminals. According to another variant of the invention, the method further comprises a phase for synchronizing the initial and destination channels, comprising a step for simultaneously sending a first beacon on said first initial channel and a second beacon on said destination channel.

The term "beacon" refers here especially to a management frame (for example according to the IEEE 802.11 standard) which contains pieces of information of the communications network. For example, the pieces of information of a channel are the identity of the access point (BSSID or "Basic Service Set Identification"), the frequency band, the channel number in this frequency band, the options supported by the PHY/MAC layers. These beacons are transmitted periodically by the access point on each channel. However, since these channels are not systematically synchronized, the beacons are not synchronized either.

According to this embodiment of the invention, a synchronization of the beacons is therefore planned, at least at the time when a switching is desired. Thus, the access point synchronizes at least the two channels concerned. In other words, the beacons of each channel are sent on each channel with the same instant of departure.

In this way, when an access point requests a terminal to change channels, it does so just before the sending of the beacons, so that the terminal that is changing channels receives the beacon from the initial channel and the beacon from the destination channel just after it has been switched to the latter channel. Thus, the change of channel is accelerated by the fact that the terminal changing channels will not have to wait for the beacon of the destination channel to continue its transmission.

According to another embodiment, the method according to the invention further comprises a step for sending, from said access point to at least one terminal linked to said access point, on said initial channel, at least one piece of information on the state of at least one channel distinct from said initial channel.

In this embodiment, a terminal can decide by itself to change of channel, without having received the order to do so from the access point. Indeed, it is informed of the state and especially of the load and/or the availabilities of at least one other channel (preferably of all the channels associated with the access point), and can therefore determine whether a switching is necessary, or desirable, depending on its current or future needs.

Advantageously, said at least one piece of information on the state of at least one channel distinct from said initial channel is transmitted by encapsulation in a beacon of said initial channel.

According to this embodiment, the invention thus enables an almost-instantaneous switching of channels. Indeed, on the initial transmission channel, pieces of information on the other channels are sent in the beacon of the initial channel, for example the beacons (or a part of the pieces of information of the beacons) for each potential destination channel. Through this encapsulation, each terminal is made aware of the state of the initial transmission channel but also of the state of the other potential destination channels. Consequently, since the terminal has been preliminarily made aware of the state of the destination channel, the channel-switching phase can be almost instantaneous.

In other words, the terminal is constantly informed of the characteristics of the potential destination channels. Thus, when it receives a command for changing allocated channels from the access point on the initial channel, the terminal has no need to wait for the destination channel beacon preliminarily synchronized with the beacon of the initial channel to switch to the destination channel. Indeed, contrary to the prior art, it can switch over immediately after having received the command for changing allocated channels since it simultaneously has available the beacon of the initial channel and the destination beacon.

In this approach, it is also possible for the access point, at any time, to ask a terminal to change channels (by specifying the destination channel or by allowing the terminal to determine its destination channel) without necessarily waiting to send the command for changing the allocated channel just before the sending of the beacons. The waiting time of the beacon of the destination channel (synchronized with the beacon of the initial channel) is thus won.

In another embodiment, the invention also pertains to a method for switching data transmission from an initial channel to a destination channel, in a terminal associated with an access point of a communications network, said access point managing a set of at least two communications channels.

According to an embodiment of the invention, such a method comprises, in said terminal, a phase for associating and authenticating with said access point, comprising a step for obtaining a unique identifier in said access point, and a phase for managing the switching implementing the following steps:

determining a destination channel managed by said access point, by processing at least one piece of information received from said access point;

switching the data transmission from said initial channel to said determined destination channel, without modifying said identifier.

Thus, according to this embodiment of the invention, a terminal can switch a current transmission over to a destination channel, without renegotiation at the destination channel of a new identifier and, as the case may be, other parameters such as the encryption keys.

From the processing of the pieces of information received from the access point, the terminal can directly perform the switching, by taking into account only the necessary pieces of synchronization information (beacons).

According to a second embodiment, the terminal detects the need to change of channel (the initial channel is overloaded or there is a need for more resources) and therefore decides to switch over. The terminal processes the information received from the access point, which enables the terminal to have knowledge of the channels managed by the access point also managing the initial channel, which enables the terminal to select an available destination channel. For example, the information received from the access point corresponds to the beacons of each potential destination channel. The terminal then switches its current transmission to the selected destination channel.

According to a particular aspect of an embodiment of the invention, said piece of information received from said access point comprises a command for changing the channel allocated to said terminal, comprising at least one piece of information for identifying said terminal and an identifier of said destination channel.

Thus, the terminal therefore receives a switching "order" or allocated channel change command emitted by the access point for its attention, and processes this command by first of all verifying that it is concerned by the command (by analyzing a "bitmap" field provided for this purpose, in one particular embodiment), and switches accordingly to the destination channel selected by the access point and specified in the switch command.

According to another variant, the method further comprises, in said terminal, the following steps:
  receiving, on said initial channel, at least one piece of information pertaining to the state of at least one other channel managed by said access point;
  deciding to switch from said initial channel to a destination channel, as a function of said at least one piece of information pertaining to the state of at least one other channel.

This piece of information can especially be a beacon, or a part of a beacon, of the other channels. According to one particular embodiment, it is transmitted encapsulated in a beacon of the initial channel, thus simplifying the synchronization of the switching.

Using these pieces of information, the terminal can decide on its own, without having received the order for it from the access point, to perform a switching, if this appears to it to be desirable or necessary, as a function of its current or future needs.

In another embodiment, the invention pertains to an access point in a communications network, exchanging data with at least one terminal linked to it, and managing a set of at least two communications channels. Such an access point comprises means for associating and authenticating a terminal with said access point, associating, with said terminal, a unique identifier in said access point, and means for managing said set of channels, implementing a reference table associating with a terminal, identified by its unique identifier, one of said channels, and also comprises:
  means for detecting a switching of a terminal linked to said access point, from a first channel, called an initial channel, to a second channel called a destination channel;
  means for updating said reference table to associate the unique identifier of said terminal with said destination channel.

Another aspect of an embodiment of the invention pertains to a terminal of a communications network, exchanging data with an access point to which it is linked, on a communications channel, called an initial channel, chosen from a set of at least two communications channels, managed by said access point.

Such a terminal comprises means for associating and authenticating with said access point, comprising means for obtaining a unique identifier in said access point, and means for managing the switching implementing:
  means for determining a destination channel managed by said access point, by processing at least one piece of information received from said access point;
  means for switching the data transmission from said initial channel to said determined destination channel, without modifying said identifier.

An embodiment of the invention also pertains to a computer program comprising instructions for implementing a method for allocating data-transmission resources or a data-transmission switching method as described here above when this program is executed by a processor.

Moreover an embodiment of the invention concerns a signal exchanged between an access point and at least one terminal for implementing a method for allocating data-transmission resources or a data-transmission switching method as described here above. According to an embodiment of the invention, such a signal carries data selectively associating at least one terminal with at least one destination channel.

As specified here above, an embodiment of the invention is characterized indeed by the fact that the change in channel is not necessarily done for all the terminals associated with a channel but can be done, on the contrary, specifically for one (or more) identified terminals.

Advantageously, such a signal further comprises at least one of the elements belonging to the group comprising:
  a field designating at least one terminal concerned by a channel switching command;
  a beacon of an initial channel encapsulating at least one beacon of at least one other channel distinct from said initial channel.

BRIEF DESCRIPTION OF THE DRAWINGS

Other characteristics and advantages shall appear more clearly from the following description of a particular embodiment, given by way of a simple, illustrative and non-exhaustive example and from the appended drawings, of which:

FIG. 4 is a detailed illustration of the particular step of "synchronization" of two asynchronous channels of the allocation method shown with reference to FIG. 2;

FIGS. 5a to 5c illustrate two variants of the invention aimed at delivering a piece of information on the state of at least one channel distinct from the initial channel;

DETAILED DESCRIPTION OF ILLUSTRATIVE EMBODIMENTS

1. General Principle

The general principle of an embodiment of the invention therefore relies on the pooling of certain parameters, especially the identifier of a terminal for all the channels associated with a same access point.

Thus, the procedure for associating and authenticating a terminal is done only once with the access point and does not need to be reiterated at each change in channel.

Consequently, a change in channel can be done in a sufficiently short time without interruption of a current transmission on a terminal that is changing of channel. Moreover, such a change in channel does not necessarily impact on all the terminals linked to the access point sending on the same channel.

Figure 1A:
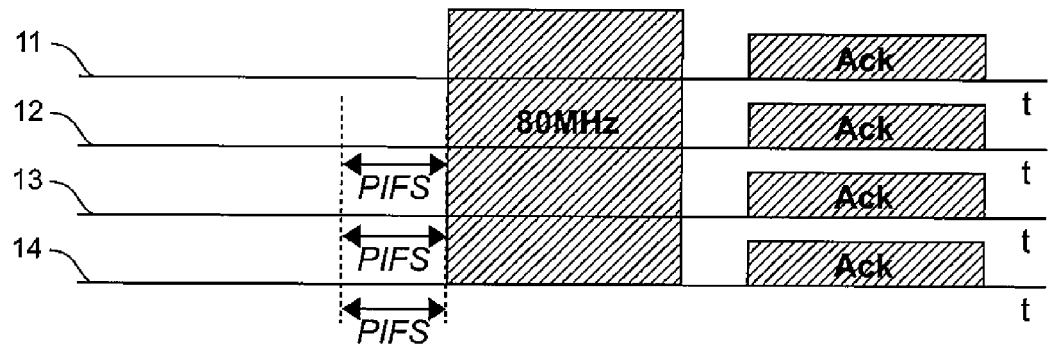
FIGS. 1a and 1b, already commented upon with reference to the prior art, illustrate two examples of known channel attribution mechanisms.
Figure 1B:
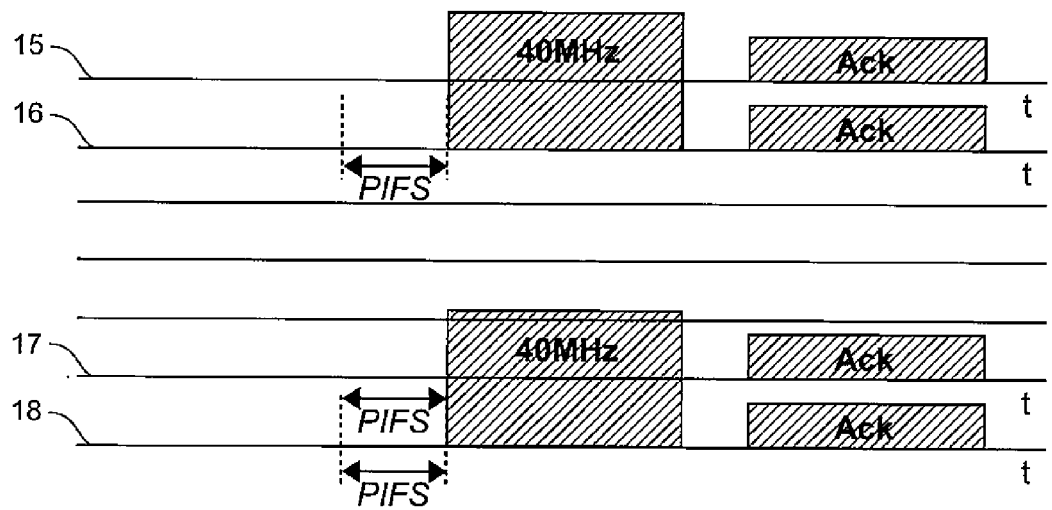
Figure 2:
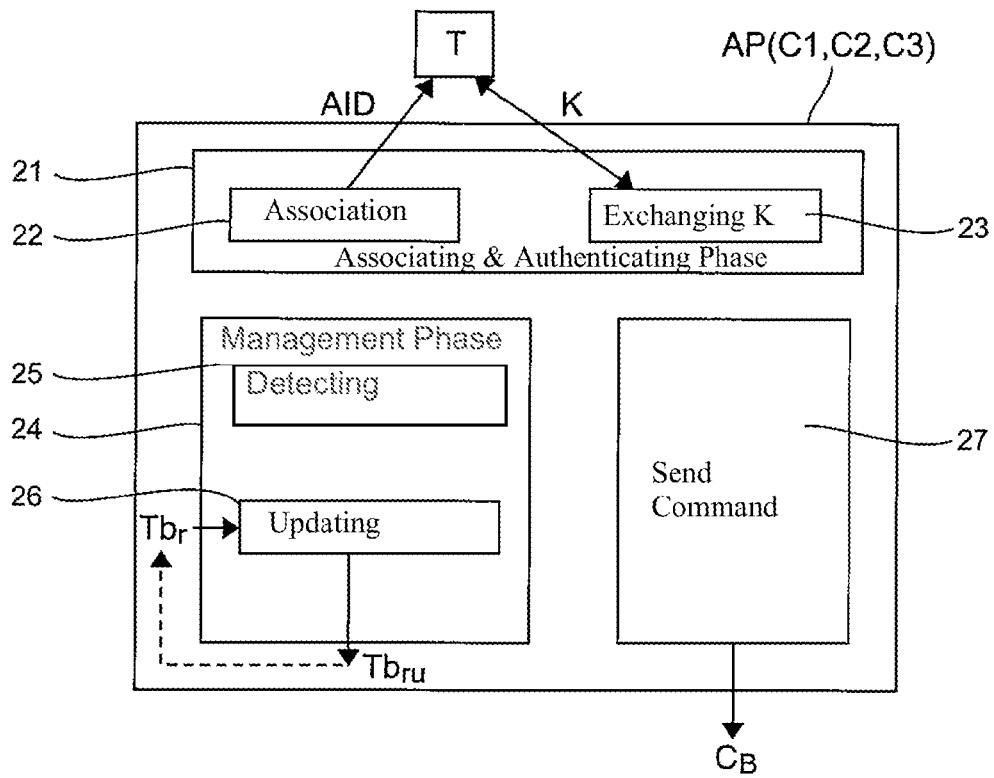
FIG. 2 presents the main steps of the allocation method implemented in an access point according to one embodiment of the invention.

Thus, as illustrated in FIG. 2, the method for allocating data-transmission resources according to this embodiment of the invention is implemented in the access point AP managing for example three channels (C1, C2, C3). A first phase 21 for associating and authenticating comprises a step of association 22 which consists in assigning a unique identifier AID to a terminal T. This identifier AID is shared by, or is available to all the channels managed by the access point, namely C1, C2, C3. Thus, the access point AP pools the information on the identity of the terminal T for all the channels C1, C2, C3 that it manages. In other words, even if the terminal T is placed on the channel C1, the channels C2 and C3 know the identity of this terminal T.

The access point AP can also manage one or more other terminals (not shown) in independently optimizing the switching of each of the terminals to a given channel.

The phase 21 for associating and authenticating can also include a step 23 for exchanging at least one encryption key K between the access point AP and the terminal T. Once this change has been made, the terminal T is identified and associated with the access point AP and the exchange of the encryption key is valid whatever the channel associated with the terminal T. In other words, the encryption key K exchanged is kept after a switching of the terminal to another channel managed by the access point AP. In the event of a switching of the terminal T, it is no longer necessary to carry out a new exchange of keys.

Thus, the single phase 21 for associating and authenticating between the terminal T and the access point AP managing several channels makes it possible to optimize the switching time because no re-association or re-authentication of the terminal is necessary when the terminal switches to a new channel managed by the access point AP.

The access point also implements a phase for managing the set of channels by means of the access point AP. This management phase 24 includes a step 25 for detecting a switching of the terminal T linked to the access point AP from a first channel, called an initial channel, to a second channel, called a destination channel.

For example, if the terminal T has switched from the channel C1 to the channel C2, once the switching is detected (25), the access point AP updates (26) a reference table $Tb_r$ to associate the terminal T with the channel C2. This detection is, for example, obtained when the terminal T, previously present on the channel C1, sends a data frame to the access point AP in using C2. The access point receives the data frame and verifies the identity of the sender terminal. It then recognizes the AID of the terminal T and then detects the fact that this terminal has switched from the channel C1 to the channel C2. Consequently, the access point modifies the reference table $Tb_r$, and indicates that the terminal T is no longer associated with the channel C1 but is henceforth associated with the channel C2. An updated reference table $Tb_{ru}$ is then obtained and is used as a reference when the access point detects a new switching.

Besides, according to certain embodiments, the access point, in knowing the availability of all the channels that it is managing, can detect the need to make the terminal T switch over. In this case, it sends (27), on the channel C1, a command $C_B$ for changing a channel allocated to the terminal T, in order that it may switch to the channel C3 for example. The command $C_B$ contains the AID of the terminal T, so that the terminal T, being placed on C1, understands that this switching command is intended for it.

For reasons of simplicity, the processing of only one terminal of the method according to an embodiment of the invention is shown. In certain cases, the same approach can be implemented for the sub-set of terminals among the set of terminals that is associated with a same channel managed by the access point. These sub-sets can be predefined or defined by the access point at a given point in time.

Figure 3:
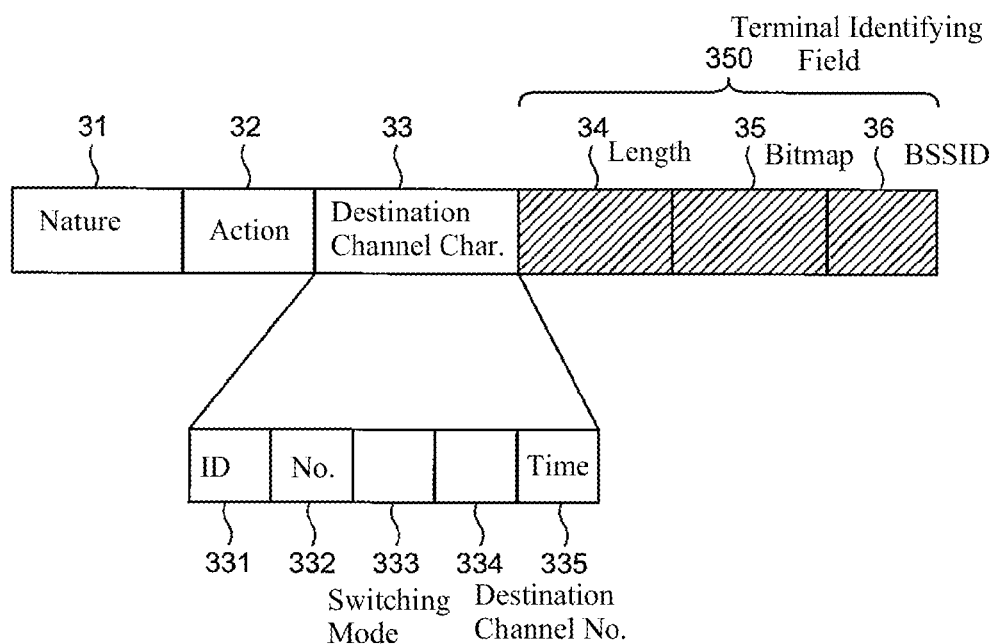
FIG. 3 presents the structure of an allocated channel changing command according to one embodiment of the invention.

Referring now to FIG. 3, we present the detailed structure of the channel change command according to one particular embodiment.

2. Detailed Description of a Channel Change Command

Referring to FIG. 3, we present a channel change command according to an embodiment of the invention, which can be sent in the signal sent by the access point on a given channel. This command contains the identifier 350 of one or more terminals, the switching of which is necessary, or a piece of information designating this terminal or these terminals (for example in the form of a bitmap field, as specified here below).

A channel change command contains several bytes, for example:
- one byte 31 indicating the nature of the command;
- one byte 32 indicating the action of the command;
- five bytes 33 indicating the characteristics of the destination channel of the switching, for example, the identifier characterizing the structure of the pieces of data of the command, the number 332 of bits necessary for the encoding of these pieces of data, the switching mode 333, the destination channel number 334, the time 335 before the switching is done, expressed in number of beacons.

The channel change command according to an embodiment of the invention further comprises the field 350 for identifying the terminal that will switch over.

According to a first variant, this field 350 contains for example two pieces of information, corresponding respectively to a field 34 indicating the length of bits on which the AID of the terminal which will change of channel is encoded, and the field corresponding to the identifier AID of the terminal which will switch over, for example encoded in binary mode.

According to a second variant, there are considered to be Z terminals on a same channel numbered 0 to Z-1. It is proposed to use a bitmap field 35 of length 34 equal to Z where the Nth bit corresponds to the Nth terminal among the Z terminals present on the same initial channel. The value of the bit indicates whether the terminal is concerned by the channel change. It is thus easy to transmit the switching command to a sub-set of terminals in a single command.

For example, there are considered to be Z=5 terminals T1, T2, T3, T4, T5 on the channel C1 and the access point AP is deemed to be seeking to send a command aimed at bringing about the switching of only M=2 terminals, for example, the terminals T2 and T4, on a channel C2. Thus, the field 34 will indicate that the length of the bitmap field is equal to 5, and the bitmap field will take for example the following form:

| 0 | 1 | 0 | 1 | 0 |
|---|---|---|---|---|

The value 0 corresponds to a holding of the terminals T1, T3 and T5 on the channel C1, and the value 1 corresponds to the switching of the terminals T2 and T4 to the channel C2.

Besides, so long as the switching of the channel has not been done, it is possible, at each sending of a beacon on the initial channel, to repeat the channel change command according to an embodiment of the invention. For example, should the switching be done only at the end of three beacons, i.e. should the field 335 indicate that the channel switching will take place at the end of three beacons, then the command for changing channels according to an embodiment of the invention can be repeated on the initial channel within the three beacons.

For the switching to be speedy, in other words, in order that, directly after the switching, the terminal can continue its transmission, it is necessary that the terminal should receive the beacon from the destination channel immediately after the switching.

Classically, the beacons are sent every 100 ms on the given channel, and the channel change command is sent just before the transmission of a beacon on the initial channel. Consequently, if the access point manages asynchronous channels, which is envisaged particularly in the future 802.11ac and 802.11ad standards, the time limit before the terminal that has switched over can retransmit can be lengthy.

Besides, the field 350 further comprises the identifier 36 of the access point in this channel (BSSID). Thus, according to one embodiment, the identifier of the access point can, if necessary, be modified.

Referring to FIGS. 4, 5a to 5c, an embodiment is now presented of an embodiment of the invention implementing asynchronous channels enabling this time limit to be reduced.

3. Description of an Embodiment of the Invention Implementing Asynchronous Channels 3.1 First Variant Implementing Asynchronous Channels The term "asynchronous channels" relates to channels having CSMA-CA modes different from one channel to another, i.e. the beacons of each channel carry, for example, different pieces of information. These pieces of information can, for example, make it possible especially to know the state of the channel, for example the identity of the access point (BSSID or "Basic Service Set Identification"), the frequency band, the number of the channel in this frequency band, the options supported by the PHY/MAC layers.

FIG. 4 represents, for example, two channels C1 and C2 to which the access point sends beacons 41 and 42 having different characteristics. In the event, FIG. 4 shows that the beacons 41 and 42 are sent by the access point with different departure times $t_{01}$ and $t_{02}$.

Consequently, if the access point, just before the beacon 42, sends a channel change command $C_B$ on the initial channel C2 to the destination channel C1, the terminal which switches to C1 has to wait for a period of time $T_A$ to be able, once again, to transmit on the channel C1.

To reduce this wait, an embodiment of the invention proposes a step (40) for synchronizing the departure times $t_{01}$ and $t_{02}$, in order to obtain a simultaneous or quasi-simultaneous sending of the beacons 41 and 42.

According to another embodiment (not shown), this synchronization can also correspond to applying an identical time slot T between the sending of two successive beacons 41 and 42 respectively, if these intervals are initially different.

3.2 Second Variant Implementing Asynchronous Channels Proposing a Quasi-Instantaneous Switching According to another particular aspect of an embodiment of the invention, it is sought to further accelerate the switching of a terminal from an initial channel to a destination channel.

To this end, an embodiment of the invention, as illustrated by FIG. 5a, provides for a sending by the access point, on the initial channel C1, of a piece of information 51 pertaining to the state of at least one channel distinct from the channel C1, the distinct channel corresponding to the destination channel of the switching. This information 51 on the state of the destination channel can correspond to the beacon, or a part of the beacon (a selection of the payload information elements), of the destination channel, said beacon being different from the beacon 52 of the initial channel C1.

According to one particular aspect of an embodiment of the invention represented by FIGS. 5b and 5c, the information 51 on the state of the destination channel can be directly integrated, by encapsulation, into the beacon 52 of the initial channel. Thus, there is obtained a single data entity 53 which corresponds, for example according to FIG. 5c, to the insertion of the information 51 on the state of the destination channel in the beacon 52 of the canal C1.

Figure 6:
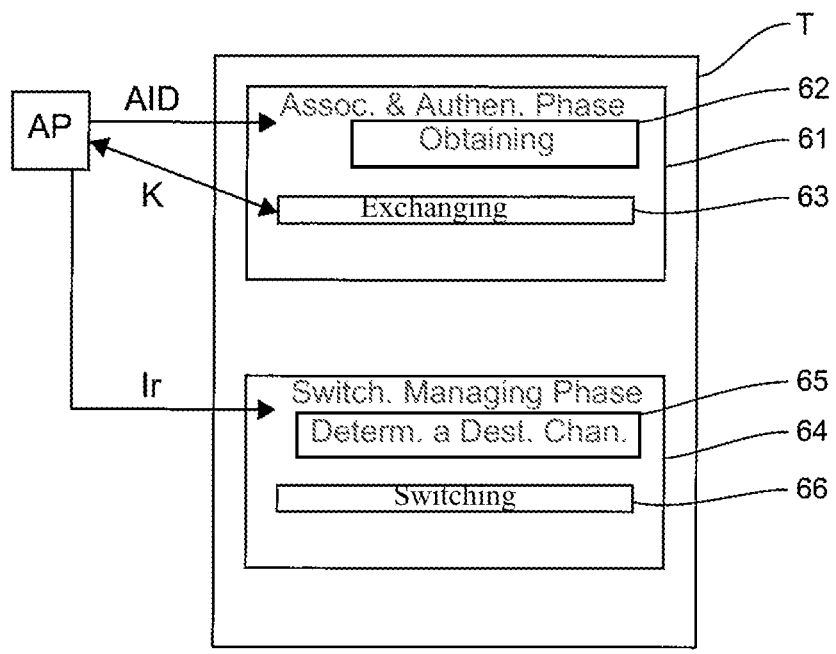
FIG. 6 presents the main steps of the method for switching in a terminal associated with an access point according to one embodiment of the invention.

4. Detailed Description of a Switching Method Implemented in a Terminal According to an Embodiment of the Invention Referring to FIG. 6, we present the switching method implemented in a terminal T according to one embodiment of the invention.

Thus, during a phase of association and authentication 61 with the access point AP managing at least two communications channels, the terminal T obtains (62) a unique identifier AID. The unique identifier AID is independent of the channel used at a given point in time.

The terminal T also exchanges (63) an encryption key K with the access point, and this enables it to get authenticated. Consequently, through this association and authentication phase (61), the identity of the terminal T is pooled and known to or made available to all the channels managed by the access point, thus enabling it to switch from one channel to another without renegotiating these pieces of information at the destination channel.

Once the association with the access point has been made, a switching managing phase (64) is activated, during which the terminal can change its channel, in case of need. To this end, the terminal determines (65) a destination channel for its switching from among the channels managed by the access point to which it is linked.

There are proposed two variants in the terminal making it possible to determine the destination channel of a possible switching. These two variants are not exclusive of each other and therefore, in certain embodiments, they can both be implemented.

According to a first variant, the terminal receives a command for changing the channel allocated to said terminal comprising the identifier AID of the terminal, or a piece of information making it possible to locate this terminal (for example the "bitmap" field already described) and an identifier of the destination channel. It is therefore the access point which, according to this variant, takes the decision to switch over, for example after analysis of the load on the different channels that it is managing, to optimize the use of the available resources.

According to a second variant, the terminal can decide of its own accord to change of channel. To this end, it must receive, on the initial channel, at least one piece of information on the state of at least one other channel managed by the access point. This piece of information can especially be the beacon of this other channel, transmitted for example encapsulated in the beacon of the initial channel, as described here above.

The terminal processes this information and makes an assessment as to whether another channel, called a destination channel, distinct from the initial is better suited to its transmission and consequently decides, on its own, to switch or not switch over towards this distinct channel which it then determines as its destination channel.

According to this particular approach, the terminal can receive the pieces of information on several channels managed by the access point to which it is linked, or even all the channels managed by the access point. The admittedly more complex processing done by this terminal then makes it possible to determine the best channel on which it can make its transmission.

Once this destination channel is determined, the terminal switches (66) to the destination channel. Once it is on the destination channel, the terminal sends data to the access point, containing its identifier AID. The access point can thus obtain knowledge of the effective switching of the terminal and updates a reference table associating the terminal T, identified by its unique identifier AID, with the previously determined destination.

5. Structure of an Access Point

Figure 7A:
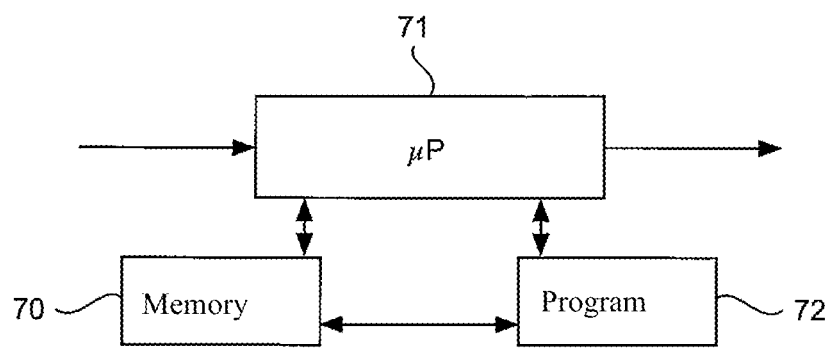
FIGS. 7a and 7b respectively illustrate the structure of an access point and of a terminal according to one embodiment of the invention.

Referring now to FIG. 7a, we present the simplified structure of an access point according to the embodiments described here above.

Such an access point comprises a memory 70 comprising a buffer memory, a processing unit 71, equipped for example with a microprocessor µP and driven by the computer program 72 implementing the method for allocating data-transmission resources according to an embodiment of the invention.

At initialization, the code instructions of the computer program 72 are for example loaded into a RAM and then executed by the processor of the processing unit 71. The processing unit 71 inputs signals from a plurality of channels. The microprocessor of the processing unit 71 implements the steps of the method for allocating data-processing resources described here above, according to the instructions of the computer program 72.

To this end, the access point comprises, in addition to the buffer memory 70, means for associating and authenticating a terminal with said access point, associating, with said terminal, a unique identifier in said access point, means for managing said set of channels, implementing a reference table associating with a terminal, identified by its unique identifier, one of said channels, means for detecting a switching of a terminal linked to said access point, from a first channel, called an initial channel, to a second channel called a destination channel and means for updating said reference table to associate the unique identifier of said terminal with said destination channel. These means are driven by the microprocessor of the processing unit 71.

6. Structure of a Terminal

Figure 7B:
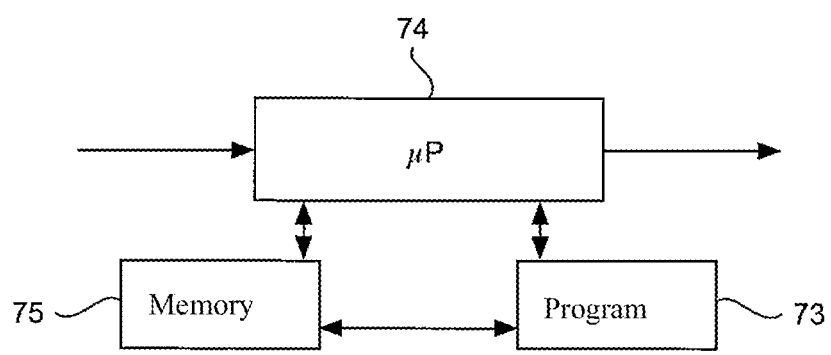

Finally, referring to FIG. 7b, we present the simplified structure of a terminal according to the embodiments described here above.

A terminal of this kind comprises a memory 75 comprising a buffer memory, a processing unit 72, equipped for example with a processor µP and driven by the computer program 73, implementing the method for switching according to an embodiment of the invention.

At initialization, the code instructions of the computer program 73 are for example loaded into a RAM and then executed by the processor of the processing unit 74. The processing unit 74 inputs a piece of information from an access point managing at least two communications channels. The microprocessor of the processing unit 74 implements the steps of the selection method described here above according to the instructions of the computer program 73.

To this end, the access point comprises, in addition to the buffer memory 75, means for associating and authenticating with said access point, comprising means for obtaining a unique identifier in said access point, and means for managing the switching implementing means for determining a destination channel managed by said access point, by processing at least one piece of information received from said access point and means for switching the data transmission from said initial channel to said determined destination channel, without modifying said identifier. These means are driven by the microprocessor of the processing unit 74.

The invention claimed is:

1. A method for allocating data-transmission frequency resources in a radiofrequency communications network, which comprises at least one multi-channel access point exchanging data with at least one terminal linked to the multi-channel access point, said multi-channel access point managing a set of at least two transmission frequency channels, the method comprising:
   implementing, by said multi-channel access point, a phase of associating and authenticating a terminal with said multi-channel access point, comprising a step of associating, with said terminal, a unique identifier in said multi-channel access point; and
   implementing, by said multi-channel access point a phase of managing said set of transmission frequency channels, implementing a reference table associating, with a terminal, identified by its unique identifier, one of said transmission frequency channels, said multi-channel access point being capable of simultaneously transmitting on said at least two frequency channels and said phase of managing comprising the following steps:
   detecting a switching of a terminal linked to said multi-channel access point, from a first transmission frequency channel, called an initial transmission frequency channel, to a second transmission frequency channel, called a destination transmission frequency channel; and
   updating said reference table to associate the unique identifier of said terminal with said destination transmission frequency channel.

2. The method according to claim 1, wherein said phase of associating and authenticating also comprises a step of exchanging at least one encryption key between said multi-channel access point and said terminal, said encryption key or keys being common for said set of transmission frequency channels.

3. The method according to claim 1, wherein the method comprises, in said multi-channel access point, a step of sending, on said initial transmission frequency channel, a command configured for changing a transmission frequency channel allocated to a terminal linked to said multi-channel access point, said command configured for changing an allocated transmission frequency channel comprising at least said identifier of the terminal and an identifier of said destination transmission frequency channel.

4. The method according to claim 3, wherein said command configured for changing a transmission frequency channel comprises a field for designating the concerned terminals, comprising a plurality of bits, each associated with one of the terminals, and taking a first value when the terminal must do the switching towards the destination transmission frequency channel and a second value when it must keep the initial transmission frequency channel.

5. The method according to claim 1, wherein the method further comprises a phase of synchronizing the initial and destination transmission frequency channels, comprising a step of simultaneously sending a first beacon on said first initial transmission frequency channel and a second beacon on said destination transmission frequency channel.

6. The method according to claim 1, wherein the method comprises a step of sending, from said multi-channel access point to at least one terminal linked to said multi-channel access point, on said initial transmission frequency channel, at least one piece of information on the state of at least one transmission frequency channel distinct from said transmission frequency initial channel.

7. The method according to claim 6, wherein said at least one piece of information on the state of at least one transmission frequency channel distinct from said initial transmission frequency channel is transmitted by encapsulation in a beacon of said initial transmission frequency channel.

8. A method comprising:
switching data transmission from an initial transmission frequency channel to a destination transmission frequency channel, in a terminal associated with a multi-channel access point of a radiofrequency communications network, said multi-channel access point managing a set of at least two transmission frequency channels and being capable of simultaneously transmitting on said at least two frequency channels, wherein switching in the terminal comprises:
a phase of associating and authenticating with said multi-channel access point, by said terminal, comprising a step of obtaining a unique identifier in said multi-channel access point, and
a phase of managing the switching, by said terminal, implementing the following steps:
determining a destination transmission frequency channel managed by said multi-channel access point, by processing at least one piece of information received from said multi-channel access point; and
switching the data transmission from said initial transmission frequency channel to said determined destination transmission frequency channel, without modifying said identifier.

9. The method according to claim 8, wherein said piece of information received from said multi-channel access point comprises a command for changing a transmission frequency channel allocated to said terminal, comprising at least one piece of information for identifying said terminal and an identifier of said destination transmission frequency channel.

10. The method according to claim 8, wherein the method comprises, in said terminal, the following steps:
receiving, on said initial transmission frequency channel, at least one piece of information pertaining to the state of at least one other transmission frequency channel managed by said multi-channel access point; and
deciding to switch from said initial transmission frequency channel to a destination transmission frequency channel, as a function of said at least one piece of information pertaining to the state of at least one other transmission frequency channel.

11. A multi-channel access point in a radiofrequency communications network, exchanging data with at least one terminal linked to the multi-channel access point, and managing a set of at least two transmission frequency channels, wherein the multi-channel access point comprises:
a processor configured to perform steps of:
implementing a phase of associating and authenticating a terminal with said multi-channel access point, comprising a step of associating, with said terminal, a unique identifier in said multi-channel access point, and
implementing a phase of managing said set of transmission frequency channels, implementing a reference table associating with a terminal, identified by its unique identifier, one of said transmission frequency channels, said multi-channel access point being capable of simultaneously transmitting on said at least two frequency channels, the phase of managing comprising:
detecting a switching of a terminal linked to said multi-channel access point, from a first transmission frequency channel, called an initial transmission frequency channel, to a second transmission frequency channel, called a destination transmission frequency channel; and
updating said reference table to associate the unique identifier of said terminal with said destination transmission frequency channel.

12. A terminal of a radiofrequency communications network, comprising:
a processor configured to perform steps of:
linking with a multi-channel access point on a transmission frequency channel, called an initial transmission frequency channel, chosen from a set of at least two transmission frequency channels, managed by said multi-channel access point, which is capable of simultaneously transmitting on said at least two transmission frequency channels;
implementing a phase of associating and authenticating with said multi-channel access point, comprising a step of obtaining a unique identifier in said multi-channel access point, and
implementing a phase of managing the switching by:
determining a destination transmission frequency channel managed by said multi-channel access point, by processing at least one piece of information received from said multi-channel access point; and
switching the data transmission from said initial transmission frequency channel to said determined destination transmission frequency channel, without modifying said identifier.

13. A non-transitory computer readable memory comprising:
a computer program stored thereon and comprising instructions for implementing a method for allocating data-transmission frequency resources in a radiofrequency communications network comprising at least one multi-channel access point exchanging data with at least one terminal linked to the multi-channel access point, said multi-channel access point managing a set of at least two transmission frequency channels, when this program is executed by a processor, wherein the instructions comprise:
instructions configured to implement in said multi-channel access point a phase of associating and authenticating a terminal with said multi-channel access point, comprising a step of associating, with said terminal, a unique identifier in said multi-channel access point; and instructions configured to implement in said multi-channel access point a phase of managing said set of transmission frequency channels, implementing a reference table associating, with a terminal, identified by its unique identifier, one of said transmission frequency channels, said multi-channel access point being capable of simultaneously transmitting on said at least two frequency channels, and said phase of managing comprising the following steps:

detecting a switching of a terminal linked to said multi-channel access point, from a first transmission frequency channel, called an initial transmission frequency channel, to a second transmission frequency channel, called a destination transmission frequency channel; and updating said reference table to associate the unique identifier of said terminal with said destination transmission frequency channel.

14. A non-transitory computer readable memory comprising:

a computer program stored thereon and comprising instructions for implementing a method for switching data transmission from an initial transmission frequency channel to a destination transmission frequency channel, in a terminal associated with an multi-channel access point of a radiofrequency communications network, said multi-channel access point managing a set of at least two transmission frequency channels and being capable of simultaneously transmitting on said at least two frequency channels, wherein the instructions comprise:

instructions configured to implement in said terminal a phase of associating and authenticating with said multi-channel access point, comprising a step of obtaining a unique identifier in said multi-channel access point, and instructions configured to implement in said terminal a phase of managing the switching implementing the following steps:

determining a destination transmission frequency channel managed by said multi-channel access point, by processing at least one piece of information received from said multi-channel access point; and switching the data transmission from said initial transmission frequency channel to said determined destination transmission frequency channel, without modifying said identifier.

* * * * *